United States Patent
Alsafar (10) Patent No.: US 8,981,897 B2
(45) Date of Patent: Mar. 17, 2015

(54) MEAT CUTTING CABINET USING LASER BEAMS

(71) Applicant: Abdullreda Abdulrasoul Alsafar, Mubarak Alkabeer (KW)

(72) Inventor: Abdullreda Abdulrasoul Alsafar, Mubarak Alkabeer (KW)

(*) Notice: Subject to any disclaimer, the term of this patent is extended or adjusted under 35 U.S.C. 154(b) by 188 days.

(21) Appl. No.: 13/753,465

(22) Filed: Jan. 29, 2013

(65) Prior Publication Data

US 2014/0210591 A1    Jul. 31, 2014

(51) Int. Cl.
  *A22C 25/04*    (2006.01)
  *A22C 17/00*    (2006.01)
  *A22B 5/20*    (2006.01)

(52) U.S. Cl.
  CPC .................................. *A22C 17/0006* (2013.01)
  USPC ...................... 340/5.53; 452/156; 219/121.58

(58) Field of Classification Search
  CPC .................................................. A22C 17/0006
  USPC ......... 340/5.53; 452/156, 157, 149; 17/52, 23, 17/24, 1; 219/121.58, 121.39
  See application file for complete search history.

(56) References Cited

U.S. PATENT DOCUMENTS

| | | | |
|---|---|---|---|
| 3,916,484 A * | 11/1975 | Kennedy ........................ 452/159 |
| 4,262,388 A * | 4/1981 | Durand et al. ................. 452/152 |
| 5,334,084 A * | 8/1994 | O'Brien et al. ................ 452/157 |
| 5,613,905 A * | 3/1997 | Van Ochten et al. ......... 452/160 |
| RE36,664 E | 4/2000 | O'Brien et al. |
| 6,050,889 A * | 4/2000 | Jacobs et al. ................... 452/160 |
| 6,126,536 A * | 10/2000 | Kielwasser .................... 452/160 |
| 6,364,758 B1 * | 4/2002 | Nielsen et al. ................. 452/117 |
| 6,727,457 B1 * | 4/2004 | Vande Berg ............. 219/121.58 |
| 6,984,803 B1 * | 1/2006 | Garnier et al. ........... 219/121.82 |
| 7,052,388 B2 * | 5/2006 | Houtz ............................ 452/157 |
| 7,918,718 B2 * | 4/2011 | Christensen et al. .......... 452/157 |
| 8,025,000 B2 | 9/2011 | Kim et al. |
| 8,500,523 B1 * | 8/2013 | Hart et al. ...................... 452/154 |
| 8,758,099 B2 * | 6/2014 | Reifenhaeuser .............. 452/157 |
| 2005/0159094 A1 * | 7/2005 | Dunivan ........................ 452/163 |

FOREIGN PATENT DOCUMENTS

GB    2364894    2/2002

* cited by examiner

*Primary Examiner* — Nam V Nguyen
(74) *Attorney, Agent, or Firm* — Richard C. Litman (57) ABSTRACT

The meat cutting cabinet provides an apparatus for automatically cutting and slicing meat using laser beams. The cabinet includes a motor disposed in the interior top thereof. The motor is connected to a winch or spool that pays out or reels in a steel cable. A steel hanger adapted for holding meat is suspended from the steel cable. Interior sidewalls of the cabinet have elongate standards extending from the upper portion to a lower portion proximate the cutting area of the cabinet. The steel hanger is slidably attached to the elongate members via channels formed in the standards. A laser carrier is disposed along an interior periphery of the cabinet and holds laser heads that can move via translation inside the carrier. This laser arrangement forms the cutting area through which the suspended meat can travel under control of a control panel connected to the spool motor.

9 Claims, 8 Drawing Sheets

Fig. 12

MEAT CUTTING CABINET USING LASER BEAMS

BACKGROUND OF THE INVENTION

1. Field of the Invention

The present invention generally relates to meat cutting apparatus and, more particularly, to a meat cutting cabinet using laser beams.

2. Description of the Related Art

It has been estimated that the beef processing industry suffers from over 10 billion dollars a year in efficiencies. About 3-4 billion dollars of that waste arises from the slaughter houses and packing plants. In a conventional packing house operation, animals are slaughtered, their hides are removed, and the resultant dressed carcass is hung in a storage cooler for subsequent cutting. During the cutting operation, the carcass is manually segmented by skilled workers into primary cuts. For instance, the primary cuts of beef are the shank, the round, the rump, the sirloin, the loin, the flank, the rib, the chuck, the plate, the brisket, and the shoulder. These primary cuts are then further cut and trimmed for sale to consumers. This primary cutting operation is time-consuming and labor intensive, requiring a number of highly skilled butchers to manually segment each carcass.

On any particular day, the manner in which the primary cuts are made will vary, depending upon the selling price that day for each primary cut. For example, the price of a loin or shoulder cut might vary a few cents per pound per day. When the price of a loin cut is high, the primary cut is positioned to maximize the weight of the loin. However, when the price of a shoulder cut is high, the primary cut is positioned to maximize the weight of the shoulder. The cuts made by butchers do not consistently produce the most effective yield because carcasses vary in size and build, and because primal cuts are not defined by any precise symmetry. However, no automated butchering system exhibits more accuracy than butchers.

Although automated butchering systems do not segment carcasses as accurately as their human counterparts, a packing house may, nonetheless, use automated butchering systems to prevent backlog and to streamline their operations. Different automated butchering systems require varying amounts of human interaction. For instance, several automated butchering systems have been developed wherein knives and other cutting implements, mechanically controlled by an operator, segment a carcass as it moves along a conveyor belt. Although cutting systems of this type have, to some extent, decreased the total man-hours required by skilled butchers, the greater accuracy achieved by manual cutting has been sacrificed. For example, an operator manually controlling an automated cutting blade is, by necessity, positioned at some distance from the carcass to be cut as the carcass moves between various cutting stations. Since a difference or only 1.25 inches in the position of a cut may have an appreciable effect upon the total value realized from the various primary cuts, the packing houses have been faced with balancing the profit lost due to inaccurate cuts against the profit gained due to greater operator efficiency.

In an effort to reduce operator intervention and to provide greater cutting accuracy, external vision systems, such as television cameras and photo sensors, have been employed to optically scan moving carcasses and to store in memory specific physical characteristics derived from the optical scanning procedure. The information stored in memory is used to control automated cutting tools that make the primary cuts. For instance, in one automated carcass cutting system, a carcass is hung on an overhead conveyor and the primary cuts are marked by a skilled cut specialist. The marks for the various cuts designate both the cut direction and the angle of cut, and the markings are made in colors that radiate particular frequencies when scanned with a light-sensitive scanner. When a detector senses that the carcass is in the proper position, it triggers a video scanning camera to rapidly scan the complete carcass. The scanning camera is filtered by a red filter so that the red meat, white fat, and bone appear the same color. However, the markings on the carcass radiate different frequencies, and are therefore sensed by the camera. The data retrieved from the video camera is stored in memory and used to control motor-driven knifes when the carcass moves from the scanning station to the cutting station.

While this system relieves butchers from the burden of manually cutting carcasses, it still requires skilled cutting specialists to mark each of the carcasses using a proper color code. Thus, the accuracy of the cut is limited by the accuracy of the color-coded markings on the surface of the carcass and by the limited maneuverability of motor-driven knives. Moreover, motor-driven knives require frequent replacement, especially when required to cut through bone, as well as meat that has been chilled or frozen fresh.

Thus, a meat cutting cabinet using laser beams solving the aforementioned problems is desired.

SUMMARY OF THE INVENTION

The meat cutting cabinet using laser beams provides an apparatus for automatically cutting and slicing meat using laser beams. The cabinet includes a motor disposed in the interior top thereof. The motor is connected to a winch or spool that pays out or reels in a steel cable. A steel hanger adapted for holding meat is suspended from the steel cable. Interior sidewalls of the cabinet have elongate members extending from an upper portion to a lower portion proximate the cutting area of the cabinet. The steel hanger is slidably attached to the elongate members via a channel formed by the elongate members. A laser carrier is disposed along an interior periphery of the cabinet and holds laser heads that can move via translation inside the carrier. This laser arrangement forms the cutting area through which the suspended meat can travel under control from a control unit connected to the spool motor.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The meat cutting cabinet using laser beams provides an apparatus for automatically cutting and slicing meat using laser beams.

Figure 1:
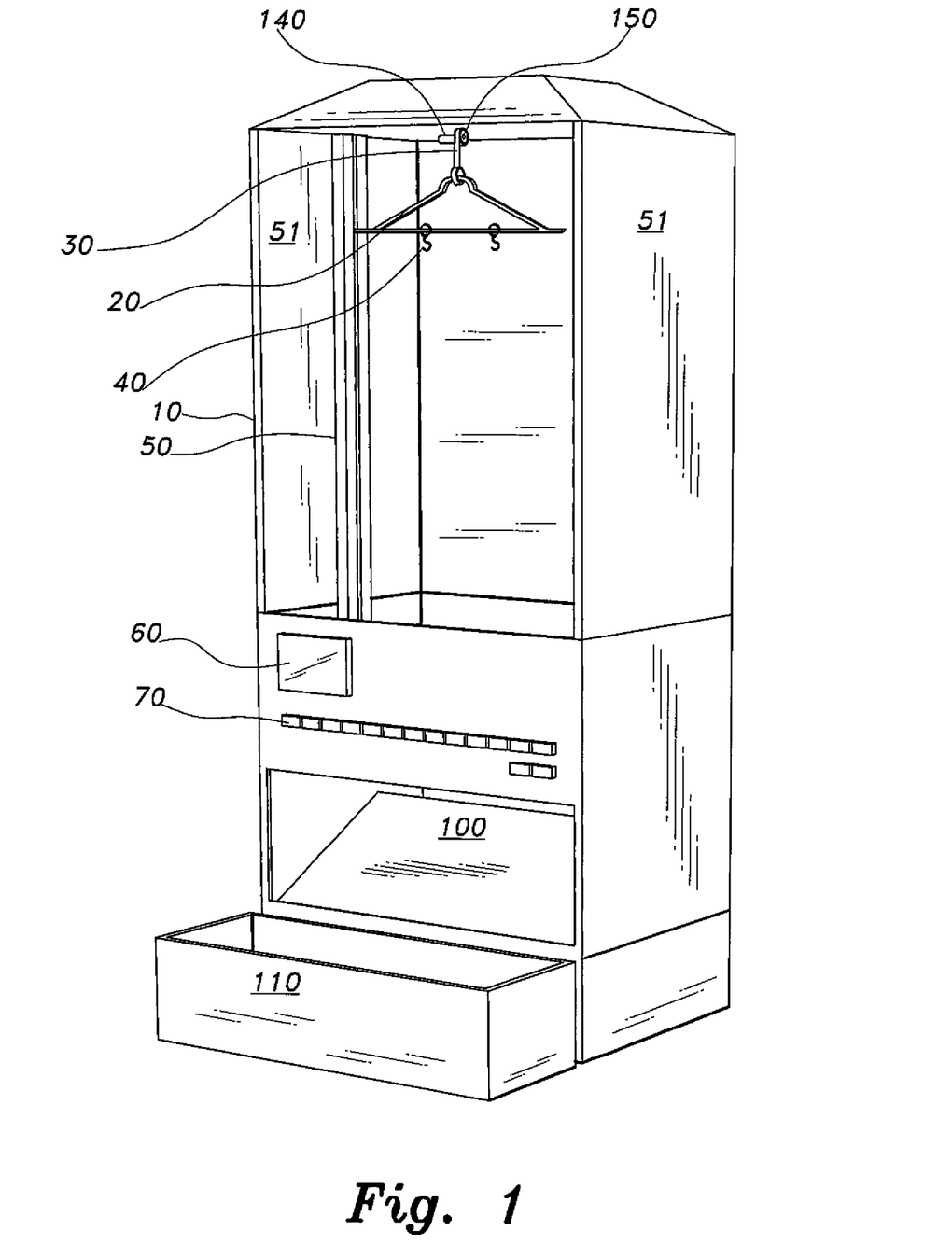
FIG. 1 is a perspective view of a meat cutting cabinet using laser beams according to the present invention.

Referring to FIG. 1, the meat cabinet has a cabinet housing 10 and a steel hanger 20 suspended from an interior top portion of the cabinet housing 10. The hanger 20 is suspended using a steel winch 150 that pays out a line 30. The hanger 20 has rods that extend laterally and are slidable vertically in guide slots defined in standards 50 that are fixed to the opposing lateral walls 51 of the cabinet housing 10. Thus, the meat to be cut can be raised and lowered by the winch 150, while the hanger 20 is constrained by the lateral guides in the standards so that the hanger 20 does not rotate. Sheep, cattle, or any other kind of animal carcass is suspended from the hanger 20 by two hooks 40.

A control panel 70 that has a control button interface is used to control the movement of the hanger 20 to a suitable height, and to open and close the cabinet 10. A display screen 60 is disposed on a mid-lower front portion of the cabinet 10 and is controlled by remote control. The display screen 60 displays meat cut measurements entered by an operator of the apparatus. The operator inputs client requirements, including such parameters as the height, width, and length of the desired cut of meat. Using the input measurements entered by the user, the control panel 70 controls the height of the carcass relative to orthogonal laser beams 80 and 90 (shown most clearly in FIG. 7), which begin cutting and slicing the meat according to the input data. It should be understood that the control panel 70 includes a microcontroller, which stores input data and processes the electromechanical operations required to cut the meat according to the specifications input to the control panel 70. The microcontroller portion of the control panel 70 includes a database that contains the relationship between the weight of the piece of meat and the measurements input by the operator. Thus, the control panel 70 assists the operator by concurrently and accurately weighting and cutting the meat portion.

Figure 2:
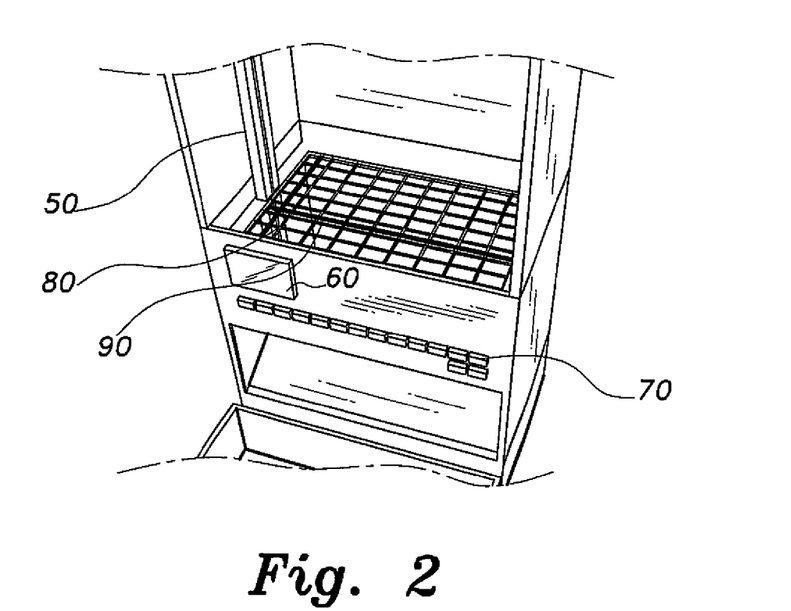
FIG. 2 is a partial perspective view of the meat cutting cabinet of FIG. 1, showing the control panel.

Laser beams 90 in orthogonal relationship with laser beams 80 cut or slice the meat according to the input data from the control panel 70, as shown in FIG. 2.

Figure 3:
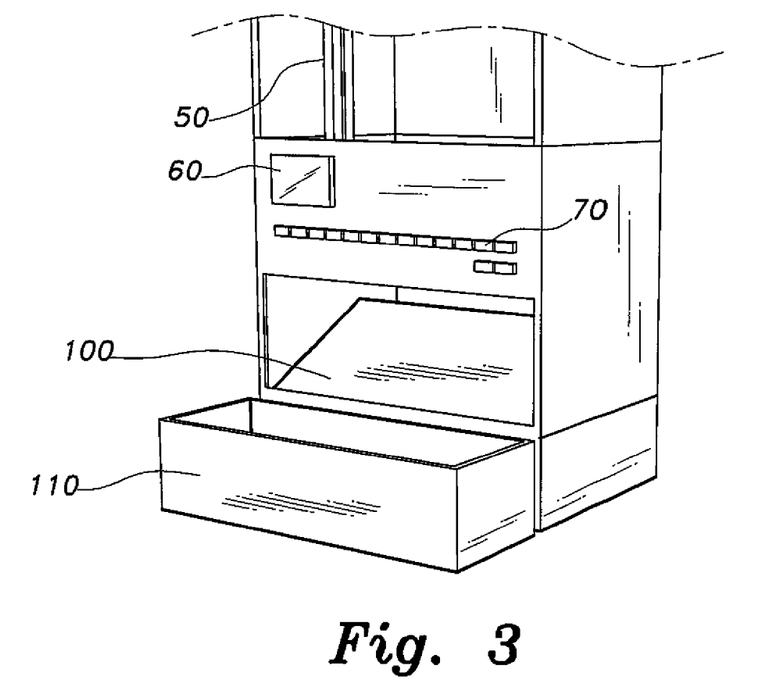
FIG. 3 is a partial perspective view of the meat cutting cabinet of FIG. 1, showing the meat cutting cavity.

The piece of meat, after being cut, falls down to the inclined planar surface 100, which is designed to allow the meat cut to slide over the inclined planar surface 100 and into the meat storage box 110 shown in FIG. 3. The control panel 70 includes a button to open or close the box 110 responsive to operator pressing the button. The box 110 may also move automatically.

Figure 4:
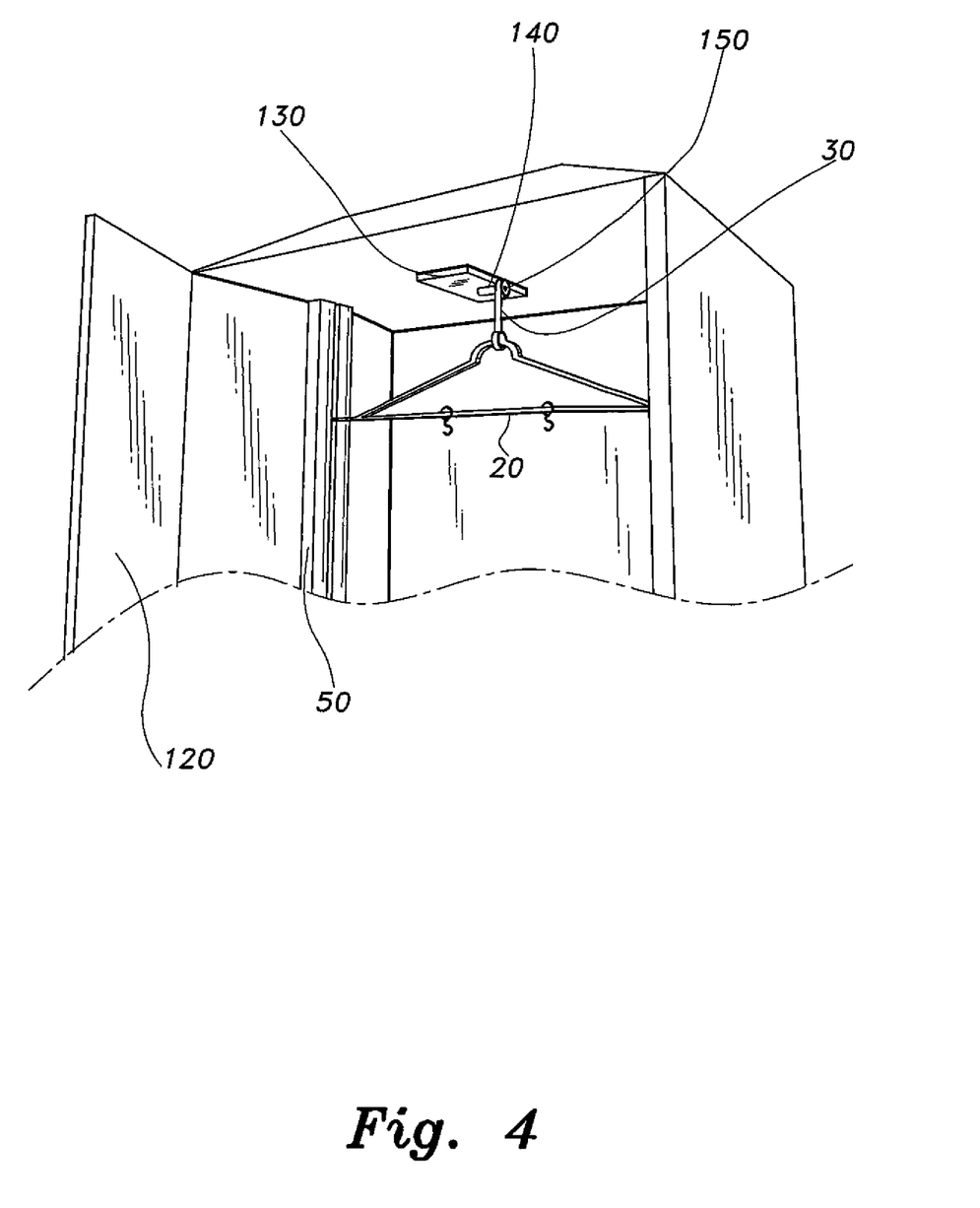
FIG. 4 is a partial perspective view of the meat cutting cabinet of FIG. 1, showing the meat hanging structure.

As shown in FIG. 4, the movement of the hanger 20 is achieved via a motor 140, which is connected to drive the winch 150 and is controlled by the control panel 70 (shown in FIG. 2). The motor 140 is disposed in the roof of the cabinet and supported by base 130.

Referring again to FIG. 4, for more safety of the meat cabinet, there is an automatic door 120, which is interlocked with power control of the cabinet. The automatic door 120 includes biometric scanning of a user's fingerprint for additional safety and protection. When the door 120 is opened the electrical power of the cabinet is turned off so that the electrical components won't work until the operator closes the door 120 and provides the authentication to the control panel 70.

Figure 5:
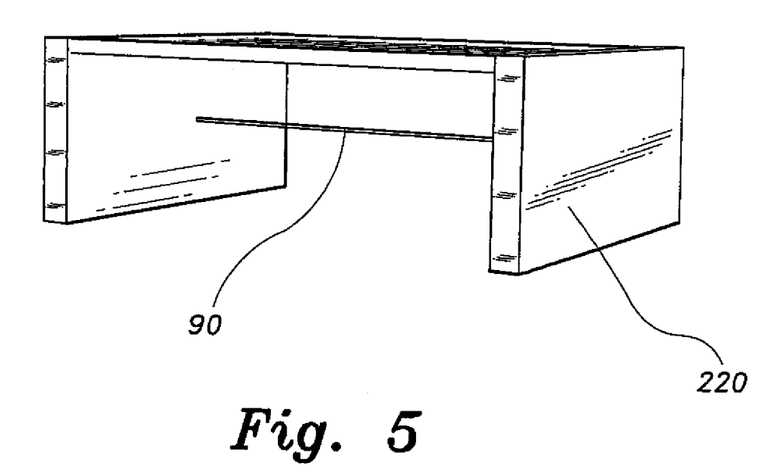
FIG. 5 is a perspective view of a laser meat cutter according to the present invention.
Figure 6:
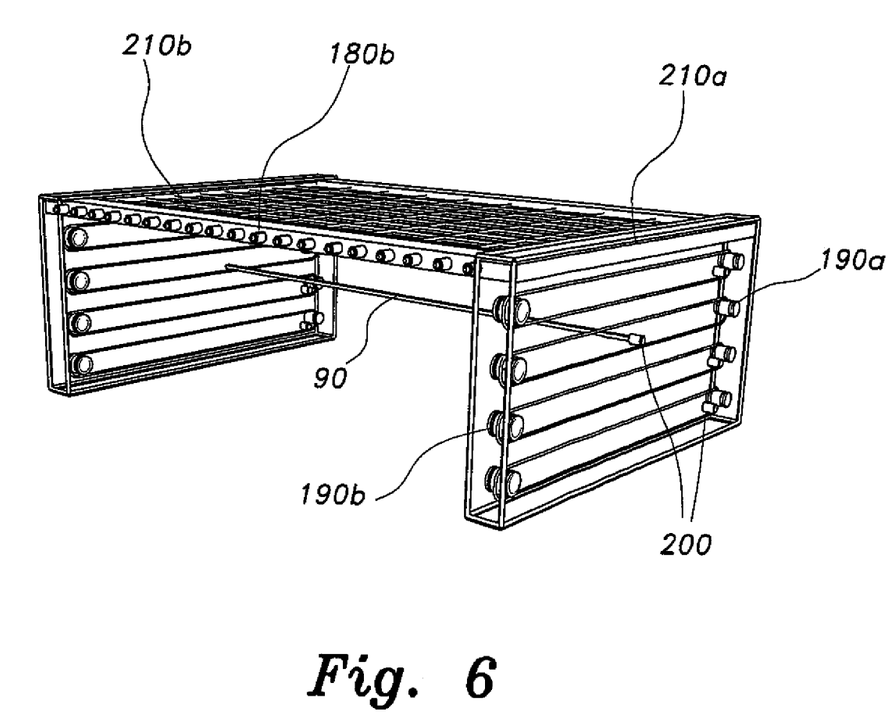
FIG. 6 is a detailed perspective view showing a laser meat cutting assembly according to the present invention.
Figure 8:
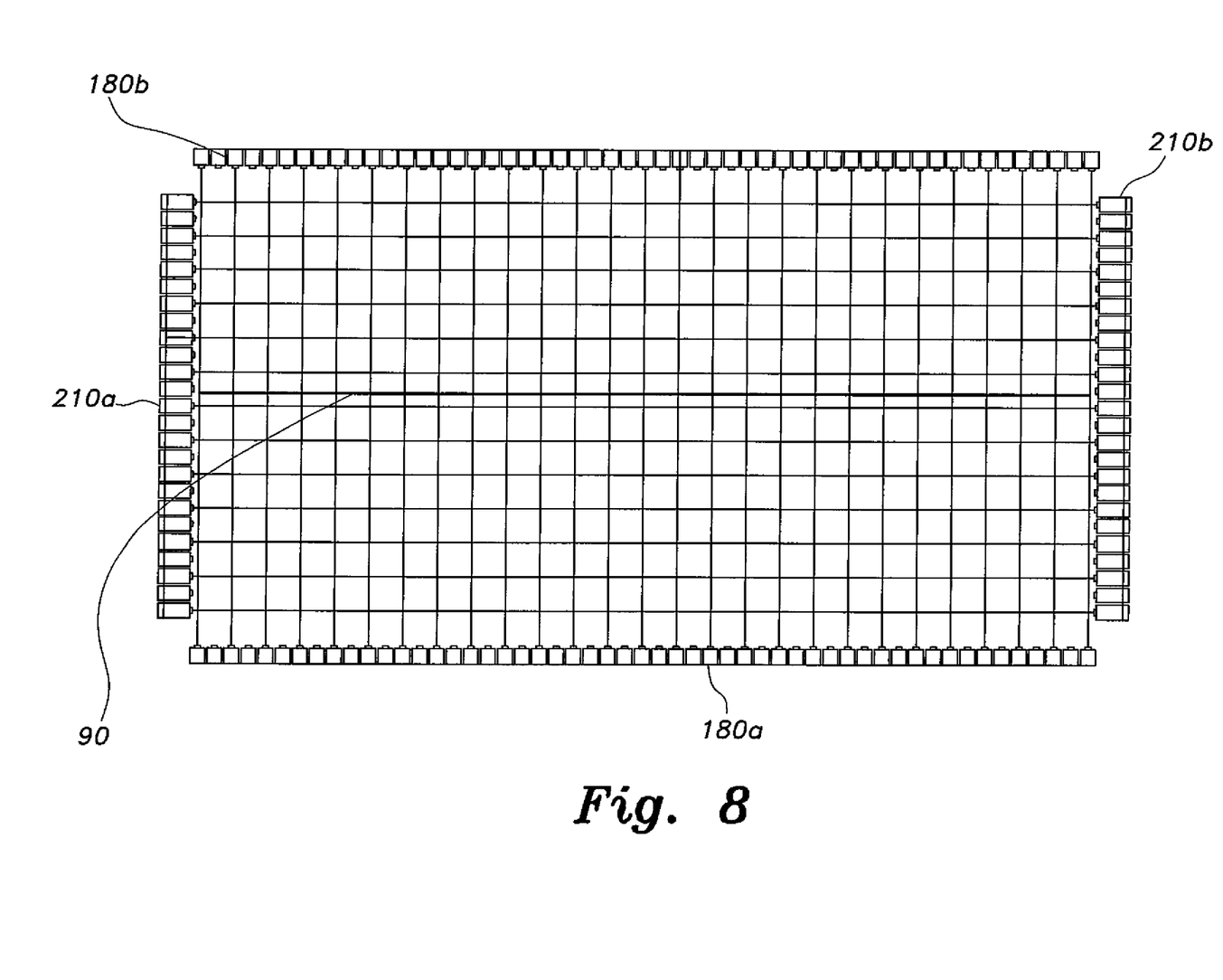
FIG. 8 is a plan view showing a laser meat cutting grid according to the present invention.

FIGS. 5 and 6 show an exemplary laser beam 90 that extends laterally across the cabinet interior from side to side. The laser head and receptacles for the beam 90 are disposed in the vertical sidewalls 220. As shown in FIG. 8, the portion of the cabinet that houses the lasers includes a surface base layer to carry the transmitted eye laser beam 180a and the received laser eye beam 180b (front to back), and the transmitted eye beam 210a and the received eye beam 210b (laterally). FIG. 8 shows the grid pattern formed by lasers 80 and 90.

Figure 7:
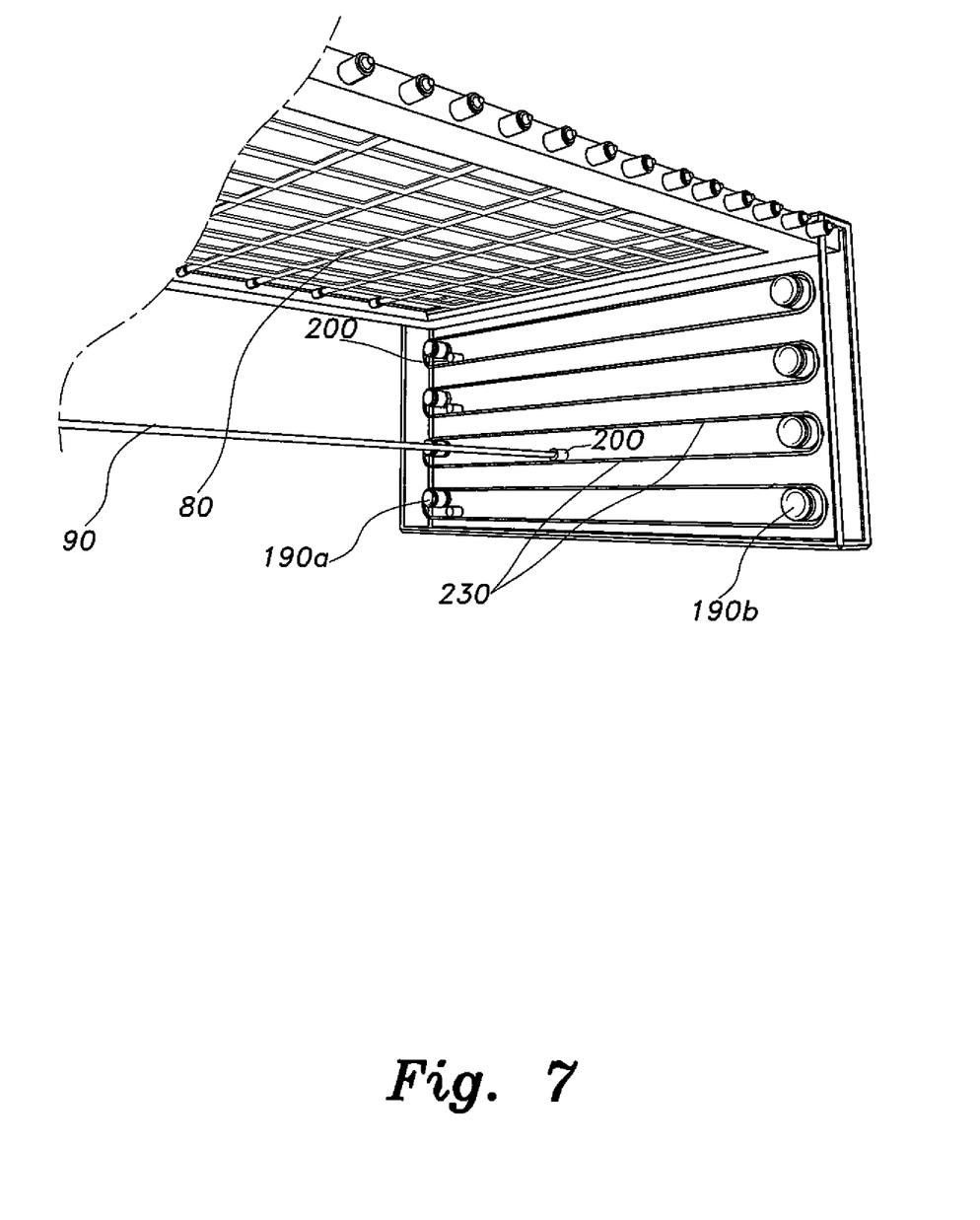
FIG. 7 is a partial perspective view of the laser meat cutting assembly of FIG. 6 as seen from below.
Figure 9:
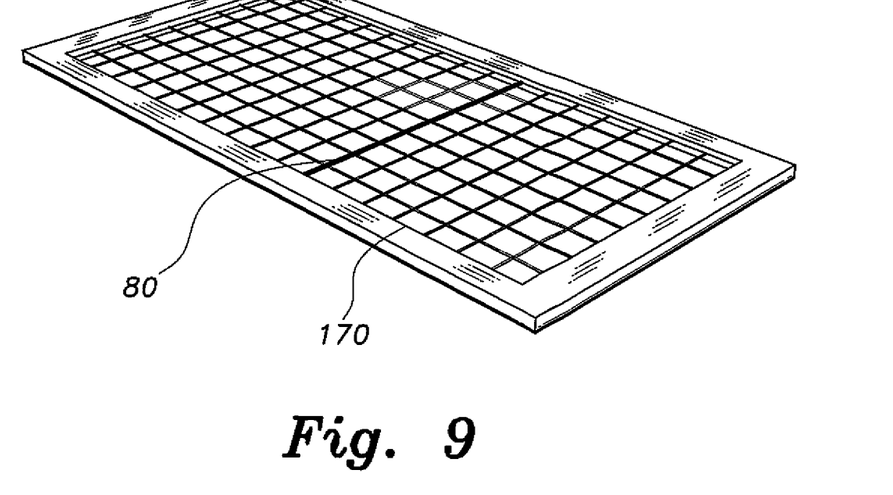
FIG. 9 is a perspective view showing a laser grid housing according to the present invention.
Figure 10:
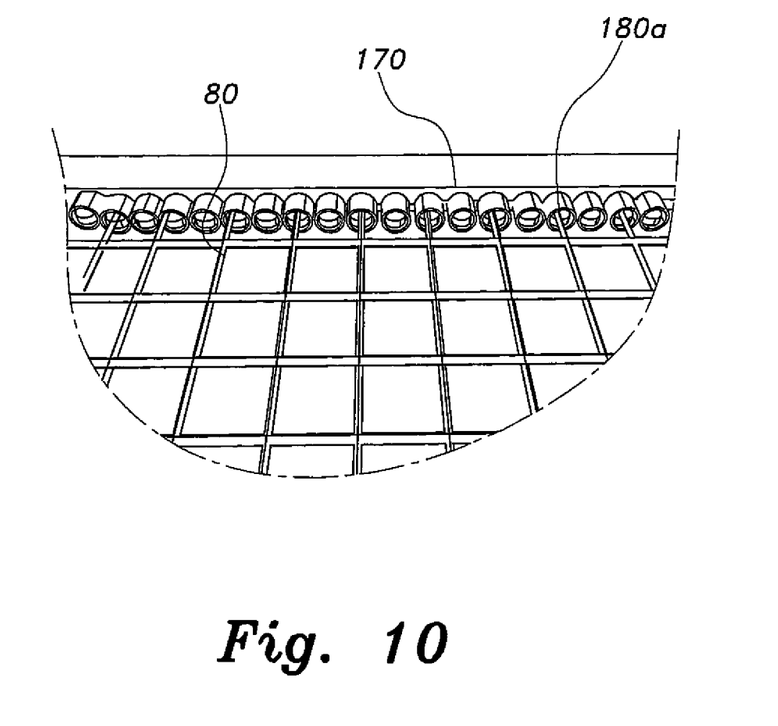
FIG. 10 is a partial perspective view of the laser grid housing of FIG. 9.
Figure 11:
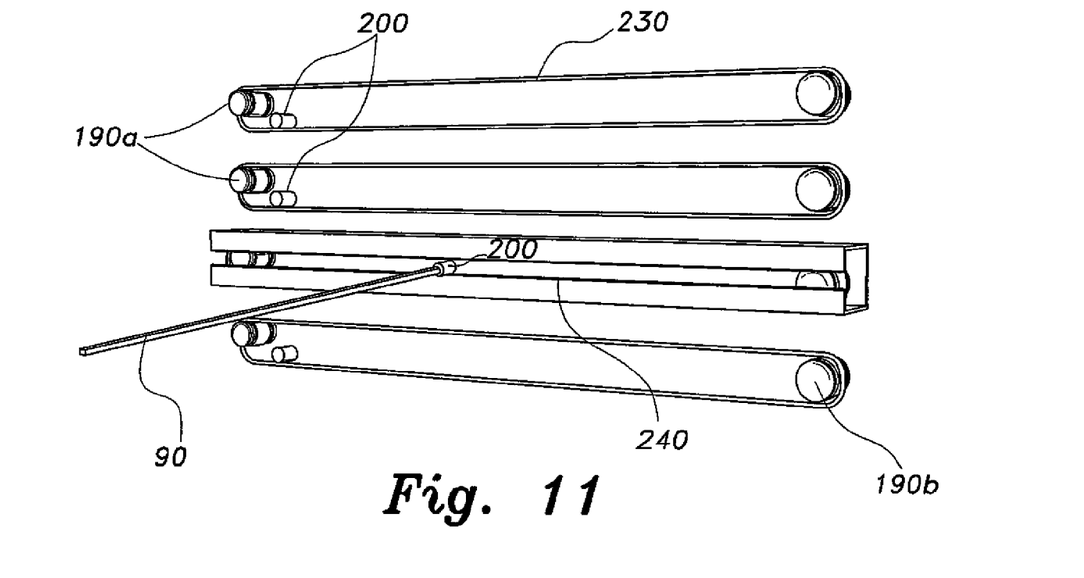
FIG. 11 is a perspective view showing the lateral laser arrangement of the meat cutting cabinet using laser beams according to the present invention.
Figure 12:
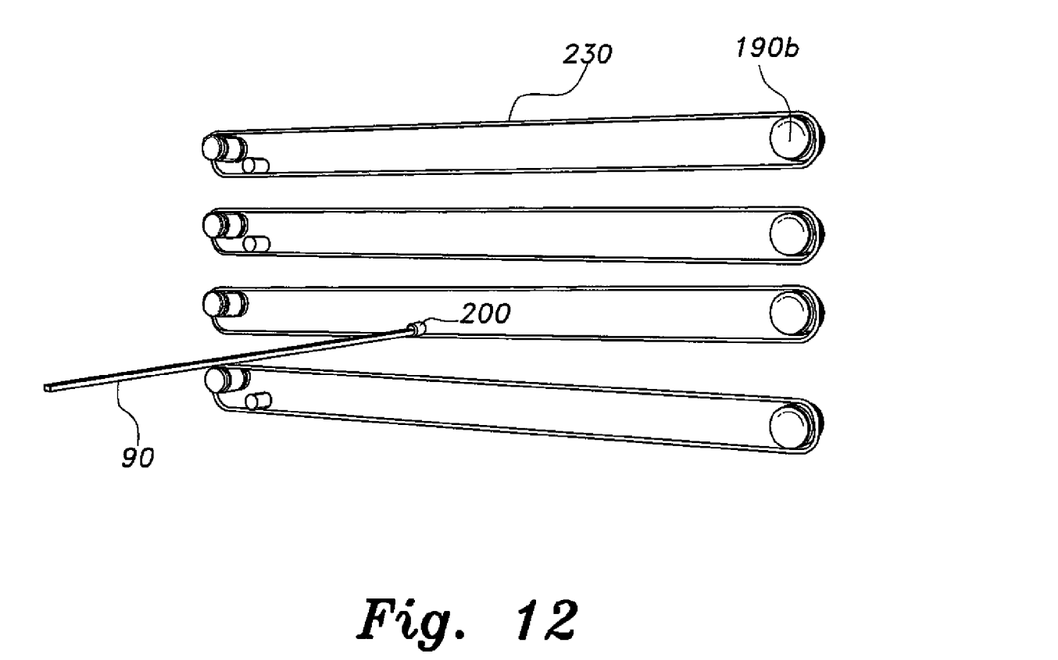
FIG. 12 is a perspective view showing the lateral tube arrangement of the meat cutting cabinet using laser beams according to the present invention.

In both cases, the operator programs the control panel 70 with the specific or the required dimensions of the needed piece of meat. Moreover, as shown in FIG. 7, each eye laser beam 200 is separated at intervals, such as 2 cm, 4 cm, 6 cm, and the like. An idler pulley 190a and a drive pulley 190b support a drive belt 230 that enables translation of the laser head (beam eye 200) front to back. The vertical side holder 220 shown in FIG. 5 is disposed on the unit so that it can carry the source of the laser eye beam, shown in FIG. 6. This frame carries sources for multiple beams 90 stacked vertically. As shown in FIGS. 11 and 12, pulleys 190a and 190b cause the belt 230 to travel in a portion of a loop, which, in turn, causes the beam source 200 to translate from front to back inside the frame 240. There is a horizontal frame 240 for each laser eye. There is a belt 230 over the horizontal frame 240 that carries the beam eye 200 from front to back in a horizontal plane. The drive pulley 190b enables the belt 230 to easily rotate. As shown in FIGS. 2, 9 and 10, the frame housing 170 allows the emitters to emit a laser beam 80 in a repetitive manner from front to back of the frame housing 170. Transmitted eye beam 180a stably projects from the beam from front to back of the frame 170.

A user can easily cut or slice meat or any kind of food automatically using laser beams based on any measurements input to the control panel 70. Also, the cabinet has many sizes, according to the kind of carcass that will be hung inside the cabinet.

A single cabinet is all that is required for cutting meat. A specific piece of a meat (height, width, thickness) can be cut using the present meat cutting cabinet. Moreover, the present meat cutting cabinet can determine the weight of a piece of meat in 1 kg increments or more or less, depending on design specifications.

It is to be understood that the present invention is not limited to the embodiments described above, but encompasses any and all embodiments within the scope of the following claims.

I claim:

1. A meat cutting cabinet, comprising:
   a meat cabinet housing;
   a motor disposed in an interior roof portion of the cabinet housing;
   a control panel in operable communication with the motor, the control unit having a button interface for accepting user-specified instructions;
   a winch in operable communication with the motor, the winch being rotated by the motor under control of the control panel;
   a cable wound around the winch;

a hanger suspended from the cable, the hanger being adapted for holding meat;

a pair of standards disposed along opposing interior sidewalls of the cabinet housing, each of the standards having a vertically extending guide slot defined therein, the hanger having rods extending laterally from opposing ends thereof, the rods being slidably disposed in the guide slots to guide the hanger vertically and prevent the hanger from rotating;

wherein the motor under direction of the control panel, rotates the winch such that the cable moves the hanger vertically within the cabinet, wherein user-specified instructions accepted by the button interface of the control panel include user-specified hanger height and user-specified meat cutting instructions;

means for storing the user-specified hanger height and the user-specified meat cutting instructions;

a laser head carrier frame disposed along the interior sidewalls and a back wall of the meat cabinet;

the laser head carrier frame including a plurality of movers, wherein each mover includes a drive pulley, an idler pulley, and a drive belt; and at least one movable laser head associated with each mover disposed in the laser head carrier frame, each one of the at least one movable laser head directing a generated beam into a path of travel of the meat inside the cabinet, each one of the at least one movable laser head being adapted for translational movement inside the laser head carrier frame by the associated mover, each one of the at least one movable laser head being in operable communication with the control panel, the control panel controlling the position of each one of the at least one movable laser head via the translational movement by the associated mover;

wherein when meat is affixed to the hanger, the control unit positions the hanger and positions the at least one movable laser head according to the stored user-specified hanger height and the stored user-specified meat cutting instructions to thereby cut the meat with the beam emanating from the at least one movable laser head.

2. The meat cutting cabinet according to claim 1, wherein the at least one movable laser head comprises a plurality of laser heads disposed in the laser head carrier frame, the plurality of laser heads being configured to form a controllable grid of laser beams extending into the path of travel of the meat.

3. The meat cutting cabinet according to claim 1, further comprising a display unit disposed on an exterior portion of the meat cutting cabinet, the display unit displaying the control inputs and operational status of the meat cutting cabinet.

4. The meat cutting cabinet according to claim 1, further comprising:
   an inclined planar surface disposed in the cabinet below the laser head carrier frame; and
   a drawer disposed below the inclined planar surface;
   wherein when the meat is cut, the meat falls to the inclined planar surface and slides along the inclined planar surface into the drawer.

5. The meat cutting cabinet according to claim 4, further comprising means for opening and closing the drawer responsive to commands input by the user into the control panel.

6. The meat cutting cabinet according to claim 5, further comprising a door disposed on the meat cutting cabinet, the door selectively opening and closing access to the interior portion of the cabinet housing.

7. The meat cutting cabinet according to claim 6, further comprising an interlock mechanism prohibiting operation of the meat cutting cabinet until the door is closed.

8. The meat cutting cabinet according to claim 7, further comprising:
   means for scanning the user's fingerprint; and
   means for authenticating the user's fingerprint to gain user access to opening the door.

9. The meat cutting cabinet according to claim 1, wherein the cable and the hanger are formed of steel.

* * * * *